United States Patent
Nakayasu

(12)
(10) Patent No.: US 6,331,496 B2
(45) Date of Patent: *Dec. 18, 2001

(54) HIGH PERFORMANCE CERAMIC MATRIX COMPOSITE

(75) Inventor: Tetsuo Nakayasu, Yamaguchi-ken (JP)

(73) Assignee: Research Institute of Advanced Material Gas-Generator, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,214

(22) Filed: Feb. 25, 1999

(30) Foreign Application Priority Data

Sep. 16, 1998 (JP) .................................................. 10-261934

(51) Int. Cl.$^7$ ..................................................... C04B 35/80
(52) U.S. Cl. ............................. 501/95.2; 501/87; 501/88; 501/85

(58) Field of Search .................................. 501/87, 88, 89, 501/95.2

(56) References Cited

U.S. PATENT DOCUMENTS

| 4,990,470 | * | 2/1991 | Yamamura et al. | 501/95.2 |
| 5,354,602 | * | 10/1994 | Stanford et al. | 501/95.2 |
| 5,552,352 | * | 9/1996 | Brun et al. | 501/88 |

FOREIGN PATENT DOCUMENTS

| 09067165 A | 3/1997 | (JP) . |
| 10287471 A | 10/1998 | (JP) . |

* cited by examiner

*Primary Examiner*—Karl Group
(74) *Attorney, Agent, or Firm*—Young & Thompson

(57) ABSTRACT

The composite includes inorganic fiber for reinforcement and a matrix of 40 to 95% by weight of silicon carbide ceramic and 5 to 60% by weight of an oxide phase dispersed in the silicon carbide ceramic. The oxide phase forms a continuous network structure in the matrix and includes $ZrSiO_4$, $BaO$—$MgO$—$Al_2O_3$—$SiO_2$ glass ceramic or $Sro$—$Al_2O_3$—$SiO_2$ glass ceramic. The matrix surrounds and fills voids between the inorganic fiber.

3 Claims, No Drawings

HIGH PERFORMANCE CERAMIC MATRIX COMPOSITE

BACKGROUND OF THE INVENTION

1. Field of the Invention

The present invention relates to a matrix for ceramic matrix composite which contains inorganic fiber for reinforcement.

2. Related Art

A ceramic matrix composite is typical of various materials having excellent heat resistance and mechanical characteristics that have been proposed for use in the aerospace industry.

Conventional ceramic matrix composites include one composed of silicon carbide ceramic as a matrix and silicon carbide fiber as reinforcing inorganic fiber for its high heat resistance and high-temperature oxidation resistance. Composites for large-sized parts are generally produced by forming a silicon carbide matrix on fabric of silicon carbide fiber by chemical vapor infiltration (CVI), polymer impregnation and pylorysis (PIP), or a like technique.

However, where the conventional techniques are followed, pores or microcracks often remain in the silicon carbide matrix. Stress is concentrated around the pores and microcracks, and the stress cannot be transmitted sufficiently to the reinforcing fiber, resulting in reduction of the strength of the composite. Further, oxygen tends to enter through the pores or microcracks to oxidize the fiber in an elevated temperature oxidizing atmosphere, also resulting in reduction of the strength.

SUMMARY OF THE INVENTION

Accordingly, an object of the present invention is to provide a matrix for high-strength composites excellent in heat resistance, oxidation resistance and mechanical characteristics.

As a result of extensive studies, the inventors of the present invention have found that the above object can be accomplished by using a matrix comprising silicon carbide ceramic having dispersed therein an oxide phase.

Having been completed based on the above finding, the present invention provides a matrix for high-performance ceramic matrix composite containing inorganic fiber for reinforcement, which comprises silicon carbide ceramic and an oxide phase having dispersed in the silicon carbide ceramic.

According to the present invention, there is provided a matrix for a high-performance composite having excellent heat resistance, oxidation resistance and mechanical characteristics in high temperature. Ceramic matrix composites produced by using the matrix of the present invention are particularly useful for various formed parts in the aerospace industry.

DETAILED DESCRIPTION OF THE PREFERRED EMBODIMENTS

The matrix for high-performance ceramic matrix composite according to the present invention will hereinafter be described in detail. The matrix comprises silicon carbide ceramic and an oxide phase that is dispersed in the silicon carbide ceramic. In other words, the matrix is a complex matrix comprising the silicon carbide ceramic and the oxide phase.

The oxide phase includes a crystalline oxide, glass such as amorphous silicate glass, phosphate glass and borate glass, and glass-ceramics (crystallized glass).

Specific examples of the crystalline oxide are oxides and complex oxides of aluminum, magnesium, silicon, yttrium, calcium, titanium, zirconium, niobium, iron, barium, strontium, beryllium, indium, uranium, tantalum, neodymium, scandium, ruthenium, rhodium, nickel, cobalt, molybdenum, manganese, germanium, hafnium, vanadium, gallium, iridium, rare earth elements, etc. Among of them, those having a coefficient of thermal expansion of $8 \times 10^6$ or smaller at 1000° C., e.g., $SiO_2$, $Al_2O_3$, $Y_2O_3$, $HfO_2$, $MgO \cdot Al_2O_3$, $BaO \cdot ZrO_2$, $MgO \cdot Cr_2O_3$, $ZrSiO_4$, $3Al_2O_3 \cdot 2SiO_2$, $2MgO \cdot 2Al_2O_3 \cdot 5SiO_2$, and $\alpha$—$Al_2O_3 \cdot TiO_2$, are preferred, and $ZrSiO_4$ is particularly preferred.

Specific examples of the glass-ceramics include $LiO_2$—$Al_2O_3$—$MgO$—$SiO_2$ glass-ceramics and $LiO_2$—$Al_2O_3$—$MgO$—$SiO_2$—$Nb_2O_5$ glass-ceramics whose main crystalline phase is β-spodumene; $MgO$—$Al_2O_3$—$SiO_2$ glass-ceramics whose main crystalline phase is cordierite; $BaO$—$Al_2O_3$—$SiO_2$ glass ceramics and $SrO$—$Al_2O_3$—$SiO_2$ glass-ceramics whose main crystalline phase is mullite or celsian; $CaO$—$Al_2O_3$—$SiO_2$ glass-ceramics whose main crystalline phase is anorthite; and $BaO$—$MgO$—$Al_2O_3$—$SiO_2$ glass-ceramics whose main crystalline phase is barium osumilite. Preference is given to $SrO$—$Al_2O_3$—$SiO_2$ glass-ceramics and $BaO$—$MgO$—$Al_2O_3$—$SiO_2$ glass-ceramics.

The oxide phase may be dispersed in the form of particles or may form a continuous phase (a network structure) in the matrix. The oxide phase can be made up of a single substance or a combination of two or more substances.

While the method for forming the oxide phase is not particularly limited, the following methods A to C are preferred for ease of formation.

Method A

A method using powdered substance or substances forming the oxide phase.

Method B

A method comprising impregnating silicon carbide ceramic with a solution of an oxide precursor capable of forming the oxide phase after being rendered inorganic, for example, a solution of an alkoxide (precursor) in a solvent, e.g., an alcohol (called a sol-gel solution), or a solution of a salt (precursor) in a solvent, e.g., water, and heat treating the impregnated ceramic in an atmosphere containing $NO_2$ gas and/or $O_2$ gas and/or $H_2O$ gas.

Method C

Vapor phase techniques, such as chemical vapor deposition (CVD), CVI or physical vapor deposition (PVD). CVD or CVI can be carried out in a known manner by using a mixture of gas or steam of at least one of a halide, a hydride and an organometallic compound of the metal(s) constituting the oxide phase and $NO_2$ gas and/or $O_2$ gas and/or $H_2O$ gas as a raw material gas. In carrying out PVD, a compound or a mixture having the same or nearly the same composition as the desired oxide phase is used as a target, or a plurality of such compounds or mixtures are used alternately to give the same composition as the desired oxide phase. If desired, PVD treatment is followed by heat treatment to form the oxide phase.

It is preferable in view of the characteristics of the ceramic matrix composite that the oxide phase be present in the matrix in an amount of 1 to 80% by weight, particularly 5 to 60% by weight, based on the whole weight of the matrix.

The silicon carbide ceramics preferably include those having the following structure (1) or (2) from the standpoint of elastic modulus, heat resistance, oxidation resistance, creep resistance and the like.

Structure (1)
  (a) an amorphous substance substantially comprising Si, Ti and/or Zr, C, and O;
  (b) (b-1) the amorphous substance (a) and (b-2) an aggregate of a crystalline substance having a grain size of 1000 nm or smaller, particularly 10 to 500 nm, comprising β-SiC and TiC and/or ZrC; or
  (c) a mixed system of (c-1) the crystalline substance (b-2) and (c-2) an amorphous structure which is present in the vicinity of the crystalline substance and comprises $SiO_x$ and $TiO_x$ and/or $ZrO_x$ ($0<x\leq2$); and the average elemental composition of (a), (b) and (c) comprising 30 to 80 wt % of Si, 15 to 69 wt % of C, and 0.005 to 20 wt % of O.

Structure (2)
  (d) an amorphous substance substantially comprising Si, C, and O;
  (e) an aggregate of (e-1) an aggregate of a crystalline substance comprising β-SiC having a grain size of 1000 nm or smaller, particularly 10 to 500 nm, and (e-2) amorphous $SiO_2$ and/or the amorphous substance (d); or
  (f) a mixture of (f-1) the crystalline substance (e-1) and/or the aggregate (e) and (f-2) a carbon flocculate; and
  the average elemental composition of structure (d), (e) and (f) comprising 30 to 80 wt % of Si, 10 to 65 wt % of C, and 0.005 to 25 wt % of O.

The term "an aggregate of a crystalline substance" as used for the structure (b) denotes an aggregate comprising a plurality of crystals having a grain size of 0.1 to 1000 nm. The term "in the vicinity of" as used for the structure (c) preferably means the region within a distance of 100 nm from the crystalline particle. The above-specified average elemental composition of Si, C and O of the structure (a), (b) and (c) is preferred for strength, elastic modulus, heat resistance, oxidation resistance, creep resistance, and the like. A still preferred elemental composition comprises 40 to 70 wt % of Si, 20 to 40 wt % of C, and 0.005 to 18 wt % of O.

The term "an aggregate of a crystalline substance" as used for the structure (e) has the same meaning as that used for the structure (b). The language "an aggregate of (e-1) an aggregate of crystalline substance and (e-2) amorphous $SiO_2$ and/or the amorphous substance (d)" as used for the structure (e) is intended to mean a plurality of aggregates each comprising (e-1) an aggregate of crystals having a grain size of 0.1 to 1000 nm and (e-2) a plurality of amorphous $SiO_2$ particles and/or a plurality of the amorphous particles (d), the particles (e-2) gathering in the vicinity (in the above-defined meaning) of the aggregate (e-1). The term "carbon flocculate" as used for the structure (f) denotes a plurality of crystalline and/or amorphous carbon particles having a particle size of 100 nm or smaller. The above-specified average elemental composition of Si, C and O of the structure (d), (e) and (f) is preferred for strength, elastic modulus, heat resistance, oxidation resistance, creep resistance, and the like. A still preferred elemental composition comprises 40 to 70 wt % of Si, 20 to 40 wt % of C, and 0.005 to 20 wt % of O.

While the method for forming the silicon carbide ceramic is not particularly limited, the following methods D to F are preferred for ease of formation.

Method D

A method comprising mixing powdered raw materials for silicon carbide ceramic, and subjecting the mixed powder to heat treatment or pressing at high-temperature.

Method E

A method comprising impregnating a preform of inorganic fiber with a solution of a precursor polymer capable of becoming silicon carbide ceramic after being rendered inorganic, such as polycarbosilane, polyzirconocarbosilane, polytitanocarbonosilane, perhydropolysilazane, polysilastyrene, polycarbosilazane, and polysilazane, in an organic solvent capable of easily dissolving the precursor, such as toluene, xylene and tetrahydrofuran, removing the solvent from the impregnated preform, and heat treating the impregnated preform to form silicon carbide ceramics. A series of the steps of impregnation, solvent removal, and heat treatment are preferably repeated several times for obtaining void-free silicon carbide ceramic. In this method rendering the polymeric precursor inorganic and consolidation or sintering proceed simultaneously.

Method F

A vapor phase techniques, such as CVD, CVI and PVD. CVD or CVI can be carried out in a known manner by using a mixture of gas or steam of at least one of a halide, a hydride and an organometallic compound of the metal(s) constituting silicon carbide ceramic and $C_nH_{2n+2}$ (n is equal to or greater than 1) gas and/or $H_2$ gas as a raw material gas. In carrying out PVD, a compound or a mixture having the same or nearly the same composition as the desired silicon carbide ceramic is used as a target, or a plurality of such compounds or mixtures are used alternately to give the same composition as the desired silicon carbide ceramic. If desired, PVD treatment is followed by heat treatment to form the silicon carbide ceramic.

The heat treating temperature in methods D to F usually ranges from 800 to 2000° C. The heat treatment is carried out in an inert atmosphere such as $N_2$ gas and Ar gas, in vacuum, or in a reducing atmosphere such as $H_2$ gas and CO gas.

It is preferable for the characteristics of the ceramic matrix composite that the silicon carbide ceramic be present in an amount of 20 to 99% by weight, particularly 40 to 95% by weight, based on the whole weight of the matrix.

The ceramic matrix composite obtained by using the matrix of the present invention exhibits excellent mechanical characteristics and fatigue characteristics in high temperature for unknown reasons, probably because (i) the oxide phase reduces stress concentration in the matrix thereby transmitting the stress to reinforcing fibers effectively, which brings about improvement in strength of the composite and (ii) the oxide phase hinders crack extension and seals the microcracks in the matrix thereby to improve the durability of the composite.

The inorganic fiber which can be used as a reinforcing material of the ceramic matrix composite is not particularly limited. For example, silicon carbide fiber, silicon nitride fiber, alumina fiber and carbon fiber are suitable, with silicon carbide fiber being preferred.

Useful silicon carbide fibers include inorganic fiber comprising Si—Ti or Zr—C—O, polycrystalline inorganic fiber comprising Si—Al—C—O available from Ube Industries, Ltd. under the trade name "TYRANO FIBER" and inorganic fiber comprising Si—C—O available from Nippon Carbon Co., Ltd. under the trade name "NICALON", "HI NICALON", or "HI NICALON TYPE S".

The inorganic fiber is preferably used in an amount of 5 to 85% by volume based on the total ceramic matrix composite.

The ceramic composite material can be produced easily by using the matrix obtained by a combination of method D, E or F (method for forming the silicon carbide ceramic) and method A, B or C (method for forming the oxide phase) and the inorganic fiber in accordance with the following methods G or H.

Method G

A method comprising mixing or combining the inorganic fiber with the matrix comprising the powdered material forming an oxide phase (used in method A) and the powdered material forming silicon carbide ceramic (used in method D), and subjecting the resulting mixture or combination to heat treatment or pressing at high-temperature. When in using inorganic short fibers, the fibers are mixed with the mixed powder providing the matrix. When in using long fibers or woven fabric, nonwoven fabric or sheeting of inorganic fibers, such a fibrous layer and the mixed powder are built up alternately, or bundles of the long fibers having adhered thereto the mixed powder of the matrix are fabricated into woven fabric, nonwoven fabric or sheeting, and the resulting structures are laid up. The resulting powder mixture or overlaid structure is shaped as desired. After or simultaneously with the shaping, heat treatment is conducted to consolidate or sinter the mixed powder for the matrix to obtain a ceramic matrix composite.

Method H

A method comprising forming an oxide phase by method A, B or C and silicon carbide ceramic by method E or F in the inside of the above-mentioned woven fabric, nonwoven fabric or sheeting of the inorganic fiber or an aggregate of small cut pieces thereof In order to change the degree of dispersion of the oxide phase or the proportion of the oxide phase, formation of the oxide phase and formation of the silicon carbide ceramic can alternate. Alternatively, formation of the oxide phase and formation of the silicon carbide ceramic can proceed simultaneously. For example, the powdered material providing an oxide phase (used in method A) is dispersed in the solution of a silicon carbide ceramic precursor polymer used in method E, the resulting dispersion is infiltrated into the inorganic fiber aggregate, and the impregnated fiber aggregate is rendered inorganic.

The ceramic matrix composite obtained by using the matrix according to the present invention exhibits excellent mechanical characteristics and fatigue characteristics at high temperature. It is therefore useful as a forming material for various parts particularly in the aerospace industry which are used under extremely severe conditions.

Having generally described the present invention, a further understanding can be obtained by reference to certain specific examples which are provided herein for purposes of illustration only and are not intended to be limiting unless otherwise specified.

EXAMPLES

The present invention will now be illustrated in greater detail with reference to Examples, but it should be understood that the present invention is not construed as being limited thereto. Unless otherwise noted, all the parts and percents are by weight.

Preparation Example

Preparation of Raw Material for Silicon Carbide Ceramic

In a 5 liter three-necked flask were charged 2.5 liters of anhydrous xylene and 400 g of sodium. After the mixture was heated to the boiling point of xylene in an $N_2$ gas stream, 1 liter of dimethyldichlorosilane was added thereto dropwise over 1 hour, followed by heating under reflux for 10 hours. The precipitate thus formed was collected by filtration, washed successively with methanol and water to obtain 410 g of polydimethylsilane as white powder.

Separately, 750 g of diphenyldichlorosilane and 124 g of boric acid were heated in n-butyl ether under an $N_2$ gas stream at 100 to 120° C. The white resinous substance thus formed was heat treated in vacuo at 400° C. for 1 hour to obtain 515 g of polyborodiphenylsiloxane. A 8.2 g portion of the resulting polyborodiphenylsiloxane and 250 g of the above-obtained polydimethylsilane were mixed and heated to 350° C. in a quartz tube equipped with a refluxing tube in an $N_2$ gas stream and maintained at that temperature for 6 hours while stirring to obtain 138 g of polycarbosilane having a siloxane bond in parts. In 0.3 liters of xylene were dissolved 40 g of the polycarbosilane and 7.3 g of titanium tetrabutoxide, and the solution was refluxed at 120° C. for 30 minutes in an $N_2$ gas stream while stirring. Thereafter, xylene was evaporated, and the residue was further heated at 300° C. for 1 hour in an $N_2$ gas stream and allowed to cool to give solid polytitanocarbosilane which was solid at room temperature.

Preparation Example 2

Preparation of Raw Material for Oxide Phase

BaO powder, MgO powder, $Al_2O_3$ powder and $SiO_2$ powder were weighed out and mixed to prepare mixed powder for glass having a total weight of 1000 g at a $BaO:MgO:Al_2O_3:SiO_2$ ratio of 14:8:28:50. The mixed powder was packed into a platinum crucible, fused by heating to 1600° C. or higher, and quenched. The resulting glass was ground to glass-ceramic powder having an average particle size of 10 μm or smaller (hereinafter designated BMAS glass-ceramic powder).

Preparation Example 3

Preparation of Raw Material for Oxide Phase

A hundred parts of a mixture consisting of 17.7% of strontium diethoxide ($Sr(OC_2H_5)_2$), 40.7% of aluminum isopropoxide ($Al(OCH(CH_3)_2)_3$), and 41.6% of tetraethoxysilane ($Si(OC_2H_5)_4$) were heat-refluxed in 100 parts of isopropyl alcohol to prepare a solution (hereinafter designated SAS sol-gel solution).

Example 1

In a mixed solution of 100 parts of the polytitanocarbosilane obtained in Preparation Example 1 and 100 parts of xylene was added 10% of the BMAS glass-ceramic powder obtained in Preparation Example 2 to preparer a slurry in such a manner that the weight ratio of the BMAS glass-ceramic powder becomes 10% based on the whole weight of the resulting matrix. Commercially available silicon carbide fiber "TYRANNO FIBER TM-S6" produced by Ube Industries, Ltd. was disentangled and soaked in the resulting slurry. After deairing under reduced pressure of 500 Torr, the fiber bundle was impregnated with the slurry in an argon atmosphere at 4 atm. The impregnated fiber bundle was heated at 100° C. in an argon gas stream to remove xylene by evaporation. The fiber bundle was then fired in an electric furnace by heating up to 1300° C. at a rate of temperature rise of 50° C./hr in a nitrogen gas stream, maintaining at that temperature for 1 hour, cooling to 1000° C. at a rate of temperature drop of 100° C./hr, and allowing to further cool to room temperature. The impregnation and firing were repeated 5 times to obtain a composite using the matrix of the present invention. The tensile strength of the resulting composite was measured in accordance with "Test method for stress-strain behavior of continuous fiber reinforced ceramic matrix composite at room and elevated temperatures (PEC-TS CMC 01-1997)" specified in the standards of Petroleum Energy Center, Japan. The results of the measurement are shown in Table 1 below.

Examples 2 to 5 and Comparative Example 1

Ceramic matrix composites were prepared in the same manner as in Example 1, except for varying the weight ratio of the BMAS glass-ceramic powder as shown in Table 1. The tensile strength of the resulting composites is shown in Table 1.

Example 6

A ceramic matrix composite was prepared in the same manner as in Example 1, except for replacing TYRANNO FIBER TM-S6 with TYRANNO FIBER ZMI-S5 produced by Ube Industries, Ltd. and replacing BMAS glass-ceramic powder with commercially available $ZrSiO_4$ powder produced by Wako Pure Chemical Industries, Ltd. The tensile strength of the resulting composite is shown in Table 2 below.

Examples 7 to 10 and Comparative Example 2

Ceramic matrix composites were prepared in the same manner as in Example 6, except for varying the weight ratio of $ZrSiO_4$ powder as shown in Table 2. The tensile strength of the resulting composite materials is shown in Table 2.

Example 11

The impregnated fiber bundle prepared in Example 6 was fired once to partially form a silicon carbide matrix. The fiber bundle in which a silicon carbide matrix had been partially formed was soaked in the SAS sol-gel solution prepared in Preparation Example 3. After deairing under reduced pressure of 500 Torr, the fiber bundle was impregnated with the sol-gel solution in an argon atmosphere at 4 atm. The impregnated fiber bundle was heated at 80° C. in an air stream to remove isopropyl alcohol by evaporation and then fired in an electric furnace by heating up to 800° C. at a rate of 50° C./hr and maintaining at that temperature for 1 hour, followed by allowing to cool to room temperature thereby to render the impregnated fiber bundle inorganic. The impregnation and rendering inorganic, which formed an oxide phase comprising $SrO$—$Al_2O_3$—$SiO_2$ glass-ceramics, were repeated three times to obtain a ceramic matrix composite using the matrix of the present invention. The weight ratio of the oxide phase was 35% based on the whole weight of the resulting matrix. The tensile strength of the resulting composite material is shown in Table 3 below.

TABLE 1

| | BMAS Glass-ceramic Powder (%) | Tensile Strength (MPa) | | | | |
|---|---|---|---|---|---|---|
| | | room temp. | 1000° C. | 1200° C. | 1300° C. | 1400° C. |
| Example 1 | 10 | 500 | 320 | 290 | 260 | 200 |
| Example 2 | 20 | 520 | 330 | 300 | 270 | 220 |
| Example 3 | 30 | 440 | 390 | 380 | 340 | 280 |
| Example 4 | 50 | 380 | 300 | 270 | 220 | 170 |

TABLE 1-continued

| | BMAS Glass-ceramic Powder (%) | Tensile Strength (MPa) | | | | |
|---|---|---|---|---|---|---|
| | | room temp. | 1000° C. | 1200° C. | 1300° C. | 1400° C. |
| Example 5 | 80 | 320 | 260 | 230 | 180 | 150 |
| Comparative Example 1 | 0 | 250 | 200 | 180 | 160 | 140 |

It was found that the silicon carbide ceramic in the matrix of the composites obtained in Examples 1 to 5 had an amorphous structure substantially comprising Si, Ti, C, and O and that the oxide phase of the matrix was formed of glass-ceramic and uniformly dispersed throughout the matrix, forming a network structure. In Comparative Example 1, no oxide phase was found dispersed in the matrix.

TABLE 2

| | $ZrSiO_4$ powder (%) | Tensile Strength (MPa) | | | | |
|---|---|---|---|---|---|---|
| | | room temp. | 1000° C. | 1200° C. | 1300° C. | 1400° C. |
| Example 6 | 10 | 450 | 400 | 390 | 380 | 360 |
| Example 7 | 20 | 480 | 410 | 400 | 390 | 380 |
| Example 8 | 30 | 500 | 430 | 420 | 410 | 400 |
| Example 9 | 50 | 420 | 400 | 380 | 340 | 300 |
| Example 10 | 80 | 380 | 360 | 330 | 300 | 250 |
| Comparative Example 2 | 0 | 310 | 250 | 220 | 190 | 180 |

It was found that the silicon carbide ceramic in the matrix of the composites obtained in Examples 6 to 10 had an amorphous structure substantially comprising Si, Ti, C, and O and that the oxide phase of the matrix was formed of $ZrSiO_4$ and uniformly dispersed throughout the matrix, forming a network structure. In Comparative Example 2, no oxide phase was found dispersed in the matrix.

TABLE 3

| | Tensile Strength (MPa) | | | | |
|---|---|---|---|---|---|
| | room temp. | 1000° C. | 1200° C. | 1300° C. | 1400° C. |
| Example 11 | 490 | 420 | 400 | 380 | 370 |

It was found that the silicon carbide ceramic in the matrix of the composite obtained in Example 11 had an amorphous structure substantially comprising Si, Ti, C, and O and that the oxide phase of the matrix was formed of glass-ceramic and uniformly dispersed throughout the matrix, forming a network structure.

While the matrix according to the present invention has been described by reference to its preferred embodiments, it should be understood that the present invention is not limited thereto, and various changes and modifications can be made without departing from the spirit and scope of the present invention.

This application claims the priority of Japanese patent application no. 10-261934 filed Sep. 16, 1998 which is incorporated herein by reference.

What is claimed is:

1. A high-performance ceramic matrix composite, containing inorganic fiber for reinforcement, and a matrix comprising 40 to 95% by weight of silicon carbide ceramic and 5 to 60% by weight of an oxide phase dispersed in said silicon carbide ceramic, said oxide phase forming a continuous network structure in said matrix, said oxide phase is selected from the group consisting of $ZrSiO_4$, BaO—MgO—$Al_2O_3$—$SiO_2$ glass ceramic, and SrO—$Al_2O_3$—$SiO_2$ glass ceramic, and said matrix surrounding and filling voids between said inorganic fiber.

2. The composite according to claim 1, wherein said silicon carbide ceramic comprises:

(a) an amorphous substance comprising Si, C, and O, and at least one of Ti and Zr;

(b) said amorphous substance and an aggregate of a crystalline substance having a grain size of 1000 nm or smaller comprising β-SiC, and at least one of TiC and ZrC; or (c) a mixed system of said crystalline substance and an amorphous structure adjacent said crystalline substance and comprising $SiO_x$, and at least one of $TiO_x$ and $ZrO_x$ ($0 < x \leq 2$); and the average elemental composition of (a), (b) and (c) comprising 30 to 80 wt % of Si, 15 to 69 wt % of C, and 0.005 to 20 wt % of O.

3. The composite according to claims 1, wherein said silicon carbide ceramic comprises:

(a) an amorphous substance comprising Si, C, and O;

(b) an aggregate of a crystalline substance comprising β-SiC having a grain size of 1000 nm or smaller and at least one of amorphous $SiO_2$ and said amorphous substance; or (c) a mixture of at least one of the crystalline substance and the aggregate with a carbon flocculate; and the average elemental composition of (a), (b) and (c) comprising 30 to 80 wt % of Si, 10 to 65 wt % of C, and 0.005 to 25 wt % of O.

* * * * *